United States Patent
Kouyama

(10) Patent No.: US 7,961,459 B2
(45) Date of Patent: Jun. 14, 2011

(54) ELECTRONIC DEVICE

(75) Inventor: Tomoaki Kouyama, Souka (JP)

(73) Assignee: Buffalo Inc., Nagoya (JP)

( * ) Notice: Subject to any disclaimer, the term of this patent is extended or adjusted under 35 U.S.C. 154(b) by 129 days.

(21) Appl. No.: 12/396,765

(22) Filed: Mar. 3, 2009

(65) Prior Publication Data

US 2009/0231799 A1 Sep. 17, 2009

(30) Foreign Application Priority Data

Mar. 3, 2008 (JP) ................................. 2008-052680

(51) Int. Cl.
*G06F 1/16* (2006.01)

(52) U.S. Cl. .............. 361/679.31; 257/678; 204/298.08; 365/189.11

(58) Field of Classification Search .................... 710/74, 710/313; 349/183, 194, 75; 204/298.03, 204/298.08, 192.12; 365/159, 211, 189.11, 365/189.15; 257/783, 439, 678; 361/679.01, 361/679.31, 679.33, 679.34–679.39

See application file for complete search history.

(56) References Cited

U.S. PATENT DOCUMENTS

| | | | | |
|---|---|---|---|---|
| 6,804,123 | B1 * | 10/2004 | Cheng ........................... | 361/784 |
| 2005/0182873 | A1 * | 8/2005 | Wang et al. ..................... | 710/74 |
| 2009/0219680 | A1 * | 9/2009 | Kouyama et al. ......... | 361/679.31 |

FOREIGN PATENT DOCUMENTS

| | | |
|---|---|---|
| CN | 2687904 Y | 3/2005 |
| JP | 7-29363 | 1/1995 |
| JP | 2002-8364 | 1/2002 |

OTHER PUBLICATIONS

U.S. Appl. No. 12/396,867, filed Mar. 3, 2009, Kouyama.

* cited by examiner

*Primary Examiner* — Hung V Duong
(74) *Attorney, Agent, or Firm* — Oblon, Spivak, McClelland, Maier & Neustadt, L.L.P.

(57) ABSTRACT

An electronic device according to the present invention includes: a substrate; first and second connectors provided on a front surface and a back surface of the substrate, respectively; and first and second storage devices connectable to the first and second connectors, respectively. In the electronic device, the first and second storage devices are connected to the connectors with the largest surfaces of each of the first and second storage devices being substantially parallel to the front surface and the back surface. Moreover, a placement position of the first connector on the front surface is not opposed to a placement position of the second connector on the back surface, with the substrate in between.

6 Claims, 12 Drawing Sheets

ELECTRONIC DEVICE

CROSS REFERENCE TO RELATED APPLICATION

This application is based upon and claims the benefit of priority from the prior Japanese Patent Application No. P2008-052680, filed on Mar. 3, 2008; the entire contents of which are incorporated herein by reference.

BACKGROUND OF THE INVENTION

1. Field of the Invention

The present invention relates to an electronic device including a substrate, connecting parts provided on the substrate, and storage devices connectable to the connecting parts.

2. Related Art

In recent years, an amount of data to be stored in a computer of each user has been increasing. To increase the data amount that can be stored, each user takes such measures as adding an electronic device such as an external hard disk device or a network hard disk drive.

A structure generally employed in such an electronic device is such that a storage device connected with a connector provided on a substrate is disposed in a housing.

A structure as shown in FIG. 1 is known to be employed in such an electronic device to further increase the amount of data that can be stored. Specifically, connectors 3, 4 are provided on a substrate 5, and storage devices 1, 2 are connected to the respective connectors 3, 4. The connector 3 is fixed to the substrate 5 by pins 7A provided on the substrate 5. The connector 4 is fixed to the substrate 5 by pins 7B provided on the substrate 5.

As shown in FIG. 1, the electronic device described above has a structure in which the storage devices 1, 2 are connected to the connectors 3, 4 of the substrate 5, respectively, with the largest surfaces 1A, 1B and 2A, 2B of the respective storage devices 1, 2 being substantially perpendicular to a front surface 5A and a back surface 5B of the substrate 5. Thus, there is a problem that the electronic device having such a structure produces a useless space S in the housing, which increases the size of the electronic device.

SUMMARY OF THE INVENTION

Hence, the present invention has been made in light of the aforementioned problems. An object of the present invention is to provide an electronic device in which multiple storage devices are disposed within the housing so as not to create a useless space, the electronic device being capable of increasing the amount of data that can be stored.

A first aspect of the present invention is summarized as an electronic device including: a substrate; connecting parts provided on a front surface and a back surface of the substrate; and two storage devices connectable to the connecting parts, wherein the storage devices are connected to the connecting parts, with a largest surface of each of the storage devices being substantially parallel to the front surface and the back surface, and a placement position of one of the connecting parts on the front surface is not opposed to a placement position of the other one of the connecting parts on the back surface, with the substrate in between.

In the first aspect of the present invention, the connecting parts can include a first connecting part provided on the front surface, and a second connecting part provided on the back surface, one of the two storage devices can be connected to the first connecting part by being moved in a first direction, the other one of the two storage devices can be connected to the second connecting part by being moved in a second direction, and the first connecting part and the second connecting part can be provided so that the first direction and the second direction are different.

A second aspect of the present invention is summarized as an electronic device including: a substrate; connecting parts provided on a front surface and a back surface of the substrate; and a storage device and a space occupying body which are connectable to the connecting parts, wherein the storage device is connected to one of the connecting parts, with the largest surface of the storage device being substantially parallel to the front surface and the back surface, the space occupying body is connected to the other one of the connecting parts, with the largest surface of the space occupying body being substantially parallel to the front surface and the back surface, and a placement position of the one connecting part on the front surface is not opposed to a placement position of the other connecting part on the back surface, with the substrate in between.

In the second aspect of the present invention, the connecting parts can include a first connecting part provided on the front surface of the substrate, and a second connecting part provided on the back surface of the substrate, the storage device can be connected to the first connecting part by being moved in a first direction, the space occupying body can be connected to the second connecting part by being moved in a second direction, and the first connecting part and the second connecting part can be provided so that the first direction and the second direction are different.

As described above, according to the present invention, it is possible to provide an electronic device in which multiple storage devices are disposed within a housing so as not to create a useless space, the electronic device being capable of increasing the amount of data that can be stored.

DETAILED DESCRIPTION OF THE INVENTION

Electronic Device According to a First Embodiment of the Present Invention

An electronic device according to a first embodiment of the present invention will be described with reference to FIGS. 2 to 8.

Figure 1:
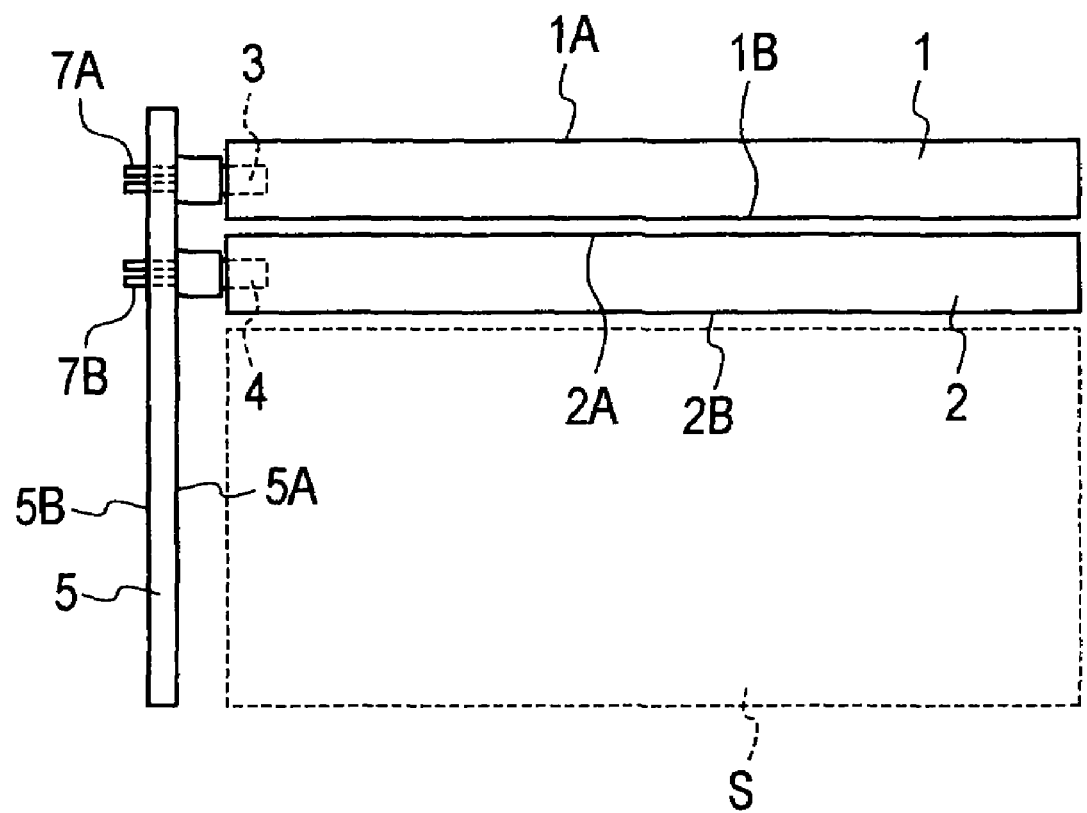
FIG. 1 is a cross sectional view of a conventional electronic device.
Figure 2:
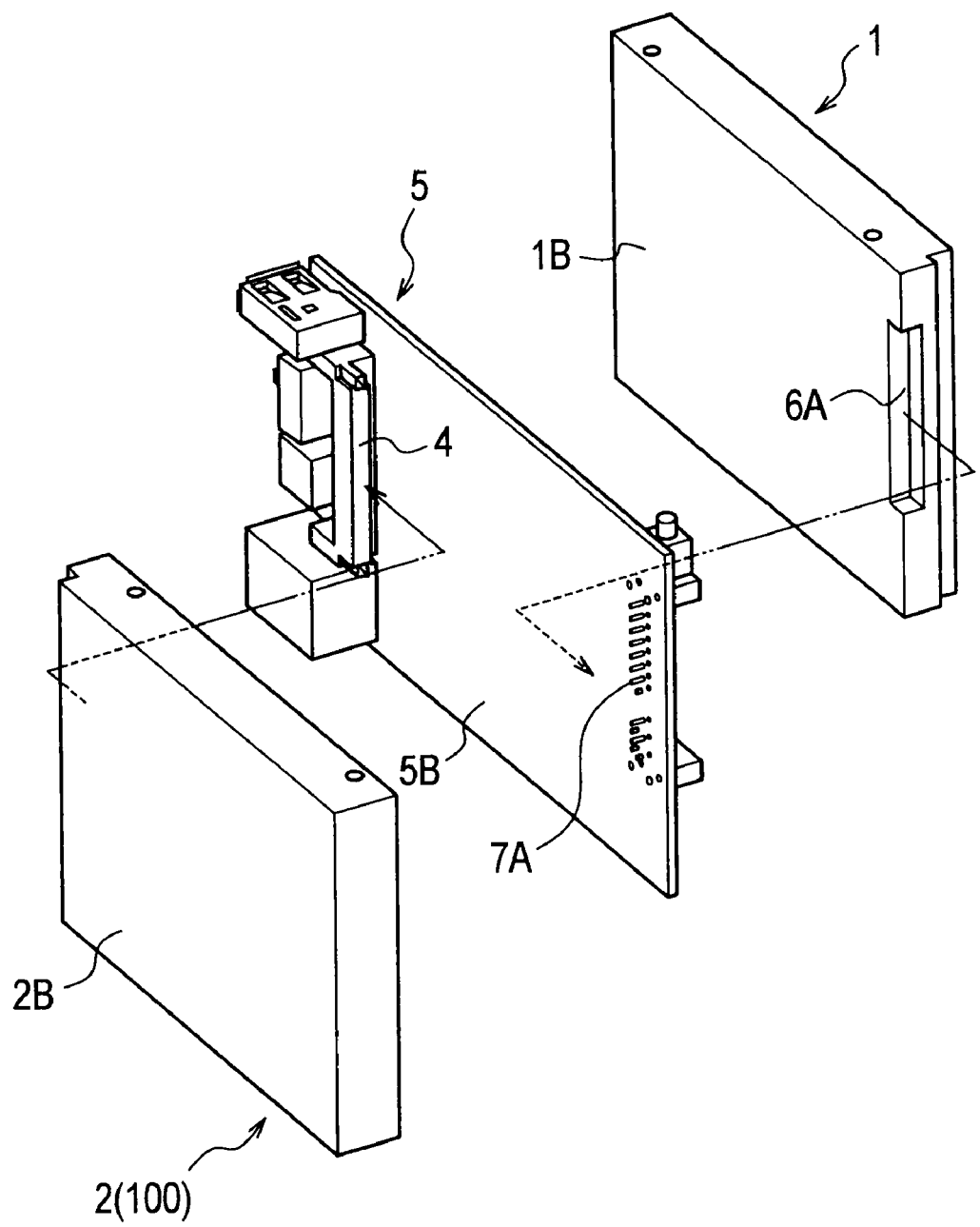
FIG. 2 is an exploded perspective view of an electronic device according to a first embodiment of the present invention.

As shown in FIG. 2, the electronic device according to the embodiment has a structure including a substrate 5, connectors 3, 4 (first and second connecting parts) provided on a front surface 5A and a back surface 5B of the substrate 5, and two storage devices 1, 2 connectable to the connectors 3, 4, respectively. In the embodiment, of the both surfaces of the substrate 5, the surface to which an interface (an USB port, for example) with an external electronic device is attached is referred to as the back surface 5B, while the other surface is referred to as the front surface 5A.

A portable magnetic storage device, such as an external hard disk device or a network hard disk drive for example, is assumed here as an electronic device according to the embodiment. However, the present invention can be applied to any electronic device having the structure described above.

Figure 3:
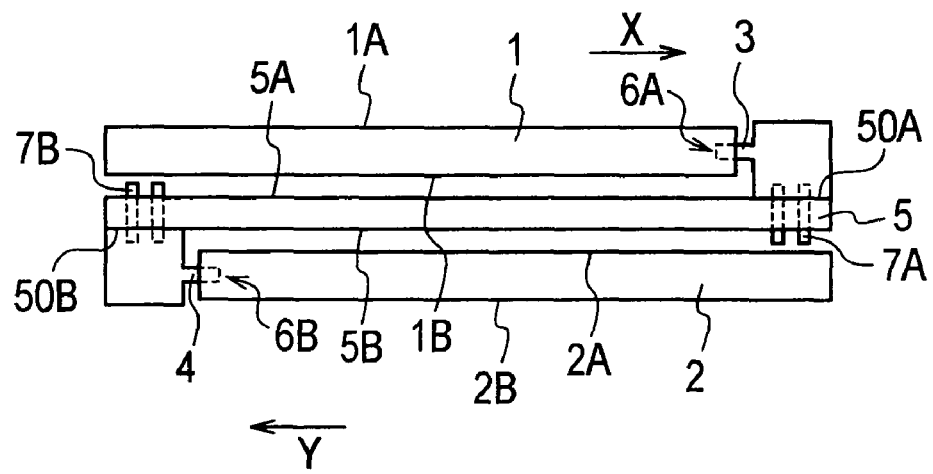
FIG. 3 is a cross sectional view of the electronic device according to the first embodiment of the present invention.

As shown in FIG. 3, the electronic device according to the embodiment has a structure in which the storage devices 1, 2 are connected with the connectors 3, 4, respectively, with the largest surfaces 1A, 1B, 2A, 2B of the storage devices 1, 2 being substantially parallel to the front surface 5A and the back surface 5B of the substrate 5. In the embodiment, each of the storage devices 1, 2 has an almost rectangular solid shape. For example, the largest surface of each of the storage devices 1, 2 is a surface having the largest area among six surfaces constituting the rectangular solid.

In addition, in the structure of the electronic device according to the embodiment, the storage device 1 (first storage device) is connected to the connector 3 (first connector) provided on the front surface 5A of the substrate 5, by being slid (moved) in a first direction X. The storage device 2 (second storage device) is connected to the connector 4 (second connector) provided on the back surface 5B of the substrate 5, by being slid (moved) in a second direction Y.

Specifically, the connector 3 provided on the front surface 5A of the substrate 5 is inserted into a depression 6A provided in the storage device 1 to be electrically connected with a terminal provided within the depression 6A.

Similarly, the connector 4 provided on the back surface 5B of the substrate 5 is inserted into a depression 6B provided in the storage device 2 to be electrically connected with a terminal provided within the depression 6B.

In the structure of the electronic device according to the embodiment, when connections to the connectors 3, 4 of the storage devices 1, 2 are complete, predetermined gaps are to be formed between the front surface 5A of the substrate 5 and the storage device 1 and between the back surface 5B of the substrate 5 and the storage device 2, as shown in FIG. 3.

In the structure of the electronic device according to the embodiment, an electronic circuit arranged on the substrate 5 is accommodated in the gaps.

Figure 4:
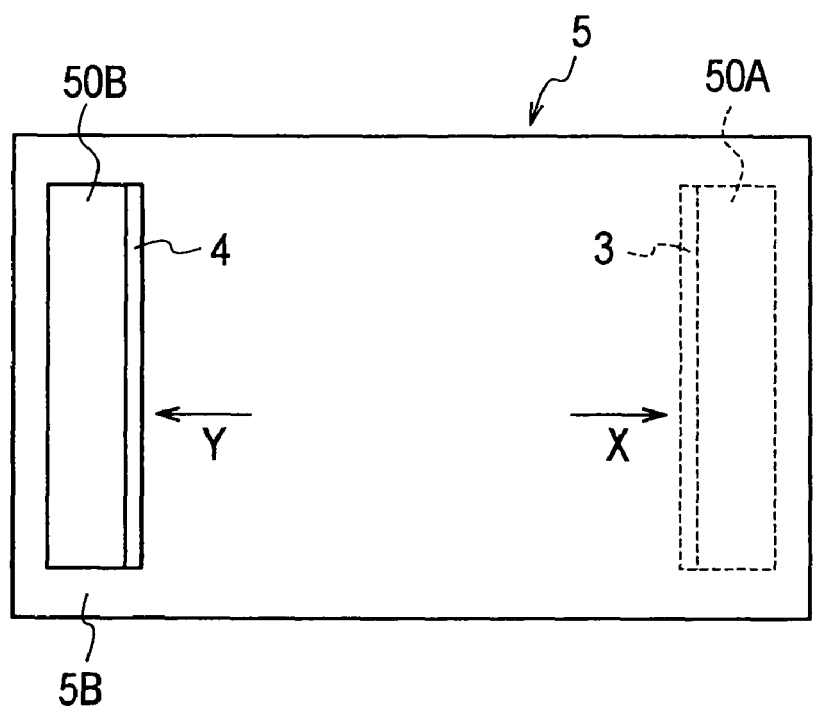
FIG. 4 is a view for describing positions of connectors provided on a substrate of the electronic device according to the first embodiment of the present invention.

As shown in FIG. 4, in the structure of the electronic device according to the embodiment, the connector 3 is provided on the front surface 5A of the substrate 5, while the connector 4 is provided on the back surface 5B of the substrate 5.

Additionally, as shown in FIG. 2, in the structure of the electronic device according to the embodiment, when the connector 3 is provided on the front surface 5A of the substrate 5, pins 7A for fixing the connector 3 to the substrate 5 protrudes from the back surface 5B of the substrate 5.

Similarly in the structure of the electronic device according to the embodiment, when the connector 4 is provided on the back surface 5B of the substrate 5, pins 7B for fixing the connector 4 to the substrate 5 protrudes from the front surface 5A of the substrate 5.

Thus, in order to avoid interference between the pins 7A and the connector 4 and interference between the pins 7B and the connector 3, as shown in FIG. 4, it is so configured that a placement position 50A of the connector 3 on the front surface 5A of the substrate 5 may not be opposed to a placement position 50B of the connector 4 on the back surface 5B of the substrate 5 with the substrate 5 in between.

However, it may be also configured so that the placement position 50A of the connector 3 on the front surface 5A of the substrate 5 partly overlaps the placement position 50B of the connector 4 on the back surface 5B of the substrate 5 with the substrate 5 in between.

Specifically, the connector 3 and the connector 4 are such provided that the first direction X and the second direction Y will be different on a plane that is substantially parallel to the front surface 5A and the back surface 5B of the substrate 5.

In an example of the electronic device according to the embodiment, the connector 3 and connector 4 are such provided that the first direction X and the second direction Y will be different by 180° (i.e., diametrically opposite).

The connector 3 is provided on a peripheral area of the front surface 5A of the substrate 5. The connector 4 is provided on a peripheral area of the back surface 5B of the substrate 5. For example, as shown in FIGS. 3 and 4, the connector 3 and the connector 4 may be provided in the farthest positions from each other in an area on the substrate 5 where the connectors may be placed.

Figure 5:
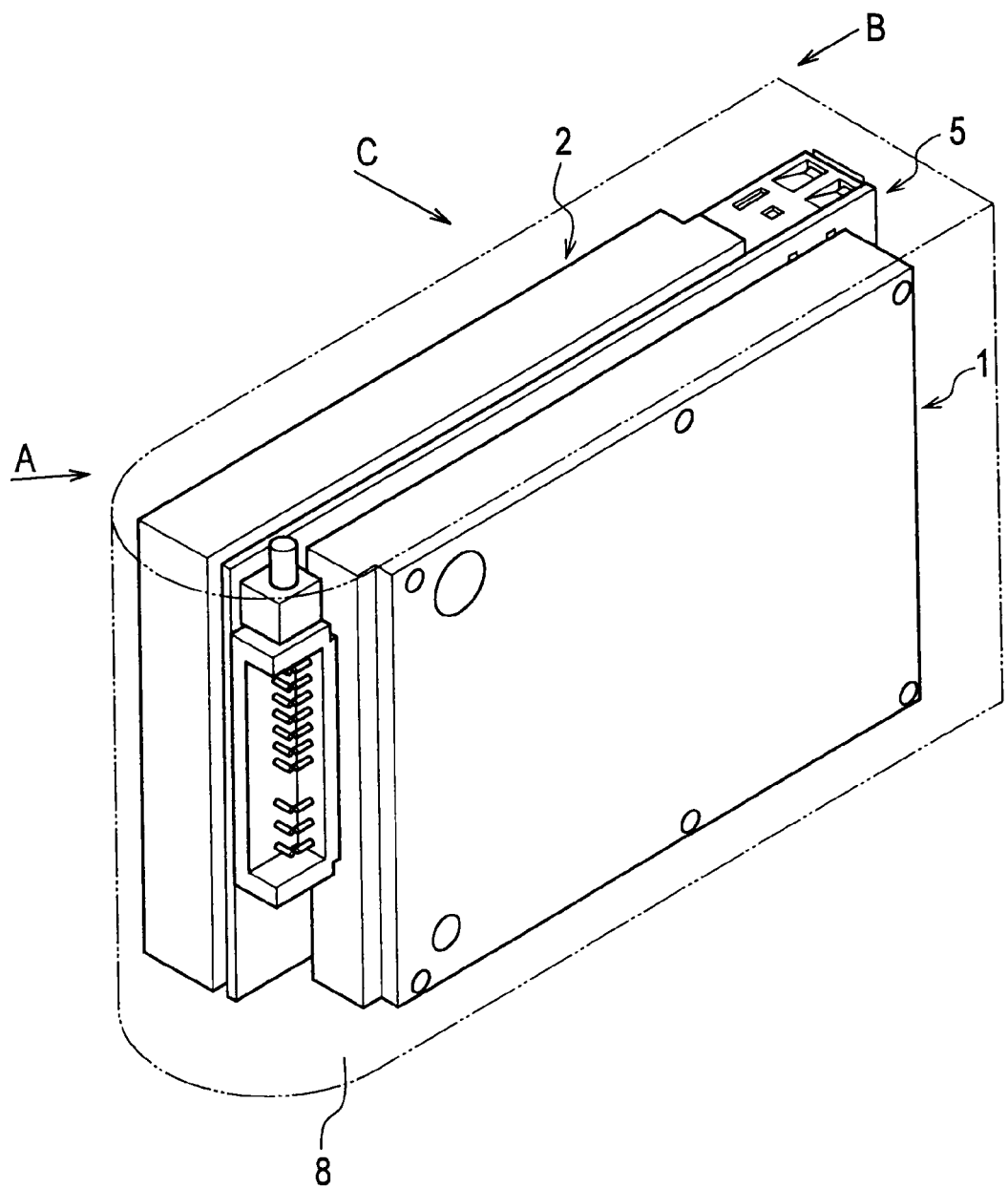
FIG. 5 is a perspective view, viewed from diagonally forward right, of the electronic device according to the first embodiment of the present invention.
Figure 6:
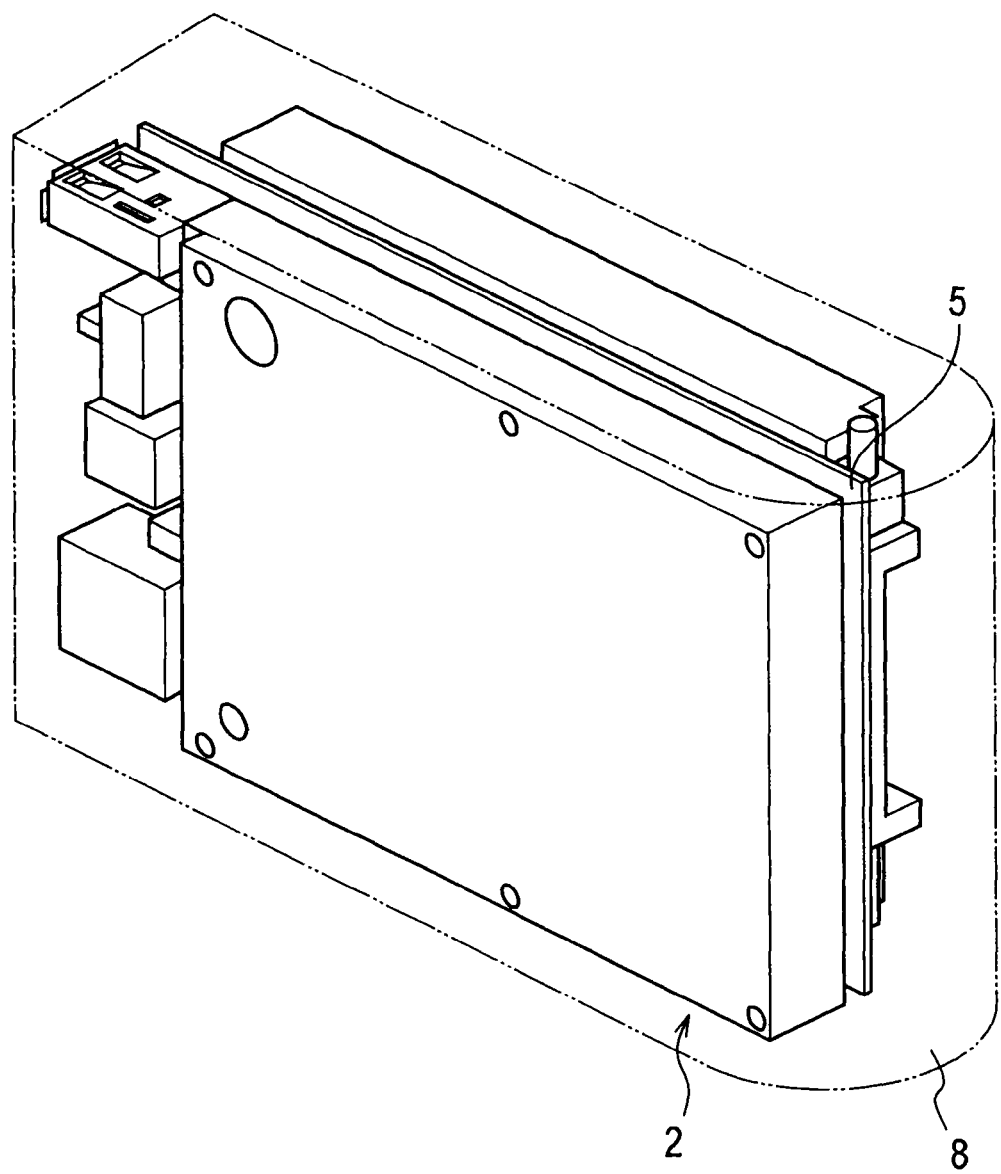
FIG. 6 is a perspective view, viewed from diagonally forward left, of the electronic device according to the first embodiment of the present invention.
Figure 7:
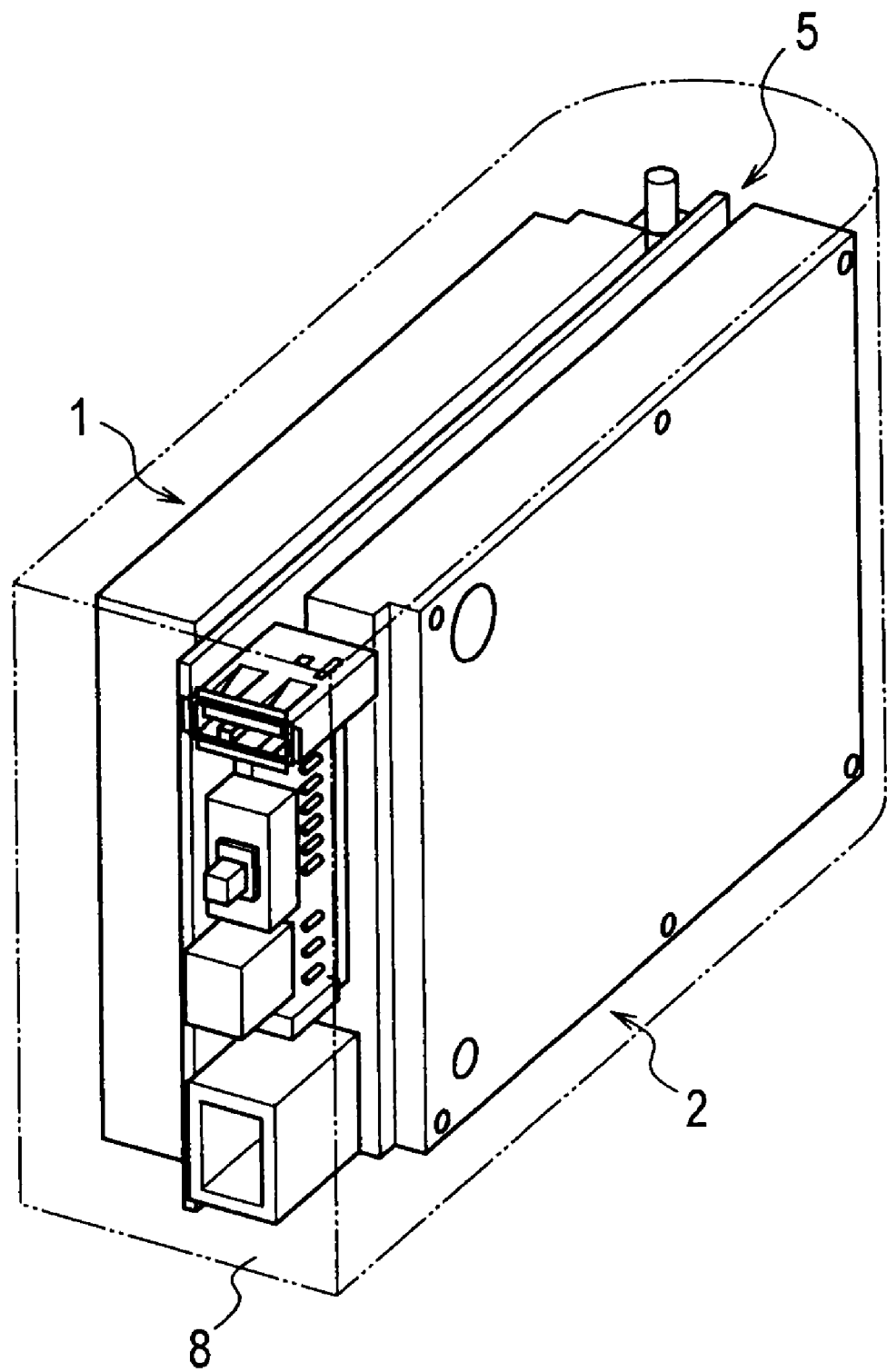
FIG. 7 is a perspective view, viewed from diagonally backward left, of the electronic device according to the first embodiment of the present invention.
Figure 8:
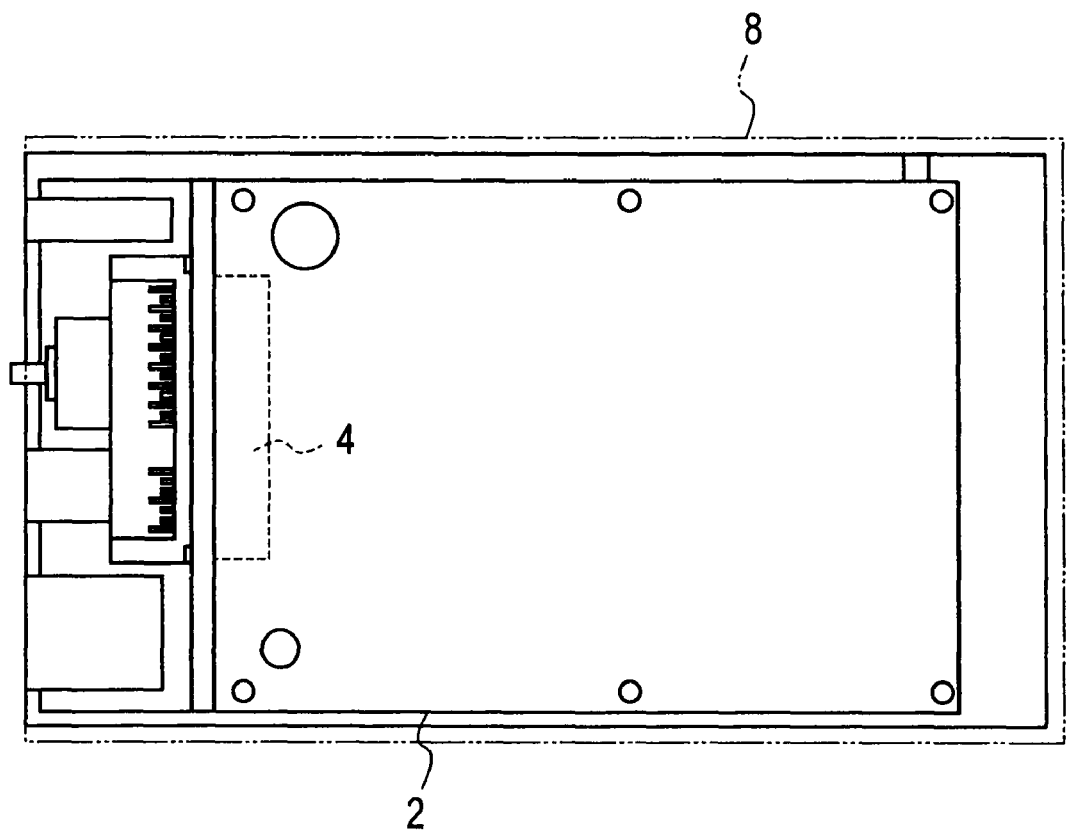
FIG. 8 is a left side elevation of the electronic device according to the first embodiment of the present invention.

Now, FIG. 5 shows a perspective view, viewed from diagonally forward right, of the electronic device according to the embodiment. FIG. 6 shows a perspective view, viewed from diagonally forward left (direction A shown in FIG. 5) of the electronic device according to the first embodiment of the present invention. FIG. 7 shows a perspective view, viewed from diagonally backward left (direction B shown in FIG. 5) of the electronic device according to the first embodiment of the present invention. FIG. 8 shows a left side elevation view (viewed from direction C shown in FIG. 5) of the electronic device according to the first embodiment of the present invention.

With the electronic device according to the embodiment, interference between the pins 7A and the connector 4 and interference between the pins 7B and the connector 3 can be avoided by moving the position to place the connector 3 away from the position to place the connector 4.

As described, the connector 3 and the connector 4 are provided in the farthest positions in an area of the substrate 5 where the connectors can be placed, and the directions in which the storage devices 1,2 are slid to be connected to the connecters 3, 4 are diametrically opposite. Accordingly, with the electronic device according to the embodiment, a useless space within a housing 8 can be reduced, and the electronic device can be thus downsized.

In addition, by making the connectors 3, 4 have the same shape, the storage device 1 (depression 6A) can have the same shape as the storage device 2 (depression 6B). Accordingly, with the electronic device according to the embodiment, production efficiency can be improved.

Modified Example 1

An electronic device according to Modified Example 1 of the present invention will be described with reference to FIG. 9.

Figure 9:
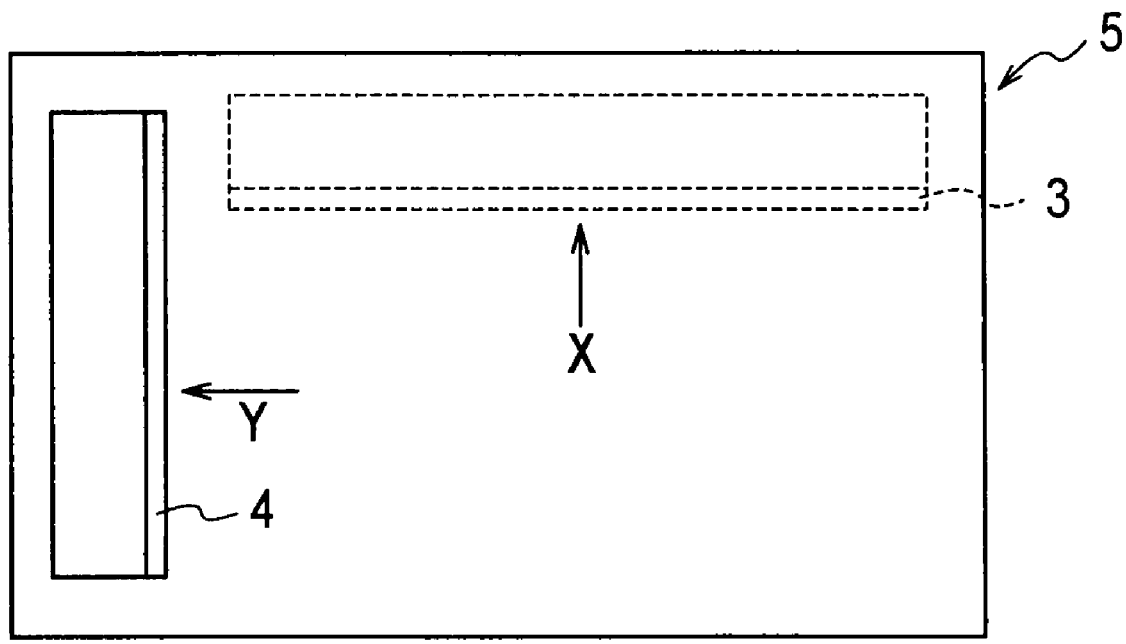
FIG. 9 is a view for describing positions of connectors provided on a substrate of an electronic device according to Modified Example 1 of the present invention.

As shown in FIG. 9, in the electronic device according to Modified Example 1 of the present invention, a connector 3 and a connector 4 are such provided that a first direction X and a second direction Y will be different by 90° on a plane that is substantially parallel to a front surface 5A and a back surface 5B of a substrate 5, rather than the connector 3 and the connector 4 being such provided that the first direction X and the second direction Y will be different by 180° (i.e., diametrically opposite) on the plane that is substantially parallel to the front surface 5A and the back surface 5B of the substrate 5.

Alternatively, in the electronic device according to Modified Example 1 of the present invention, the connector 3 and the connector 4 may be such provided that the first direction X and the second direction Y will be different by any other selected angles on the plane that is substantially parallel to the front surface 5A and the back surface 5B of the substrate 5.

In addition, the shapes of the storage device 1 (or depression 6A) and the storage device 2 (or depression 6B) are formed according to positions where the connectors 3, 4 will be placed.

Furthermore, as shown in FIG. 9, the connectors 3, 4 may have different shapes.

Modified Example 2

An electronic device according to Modified Example 2 of the present invention will be described with reference to FIGS. 10 and 11.

Figure 10:
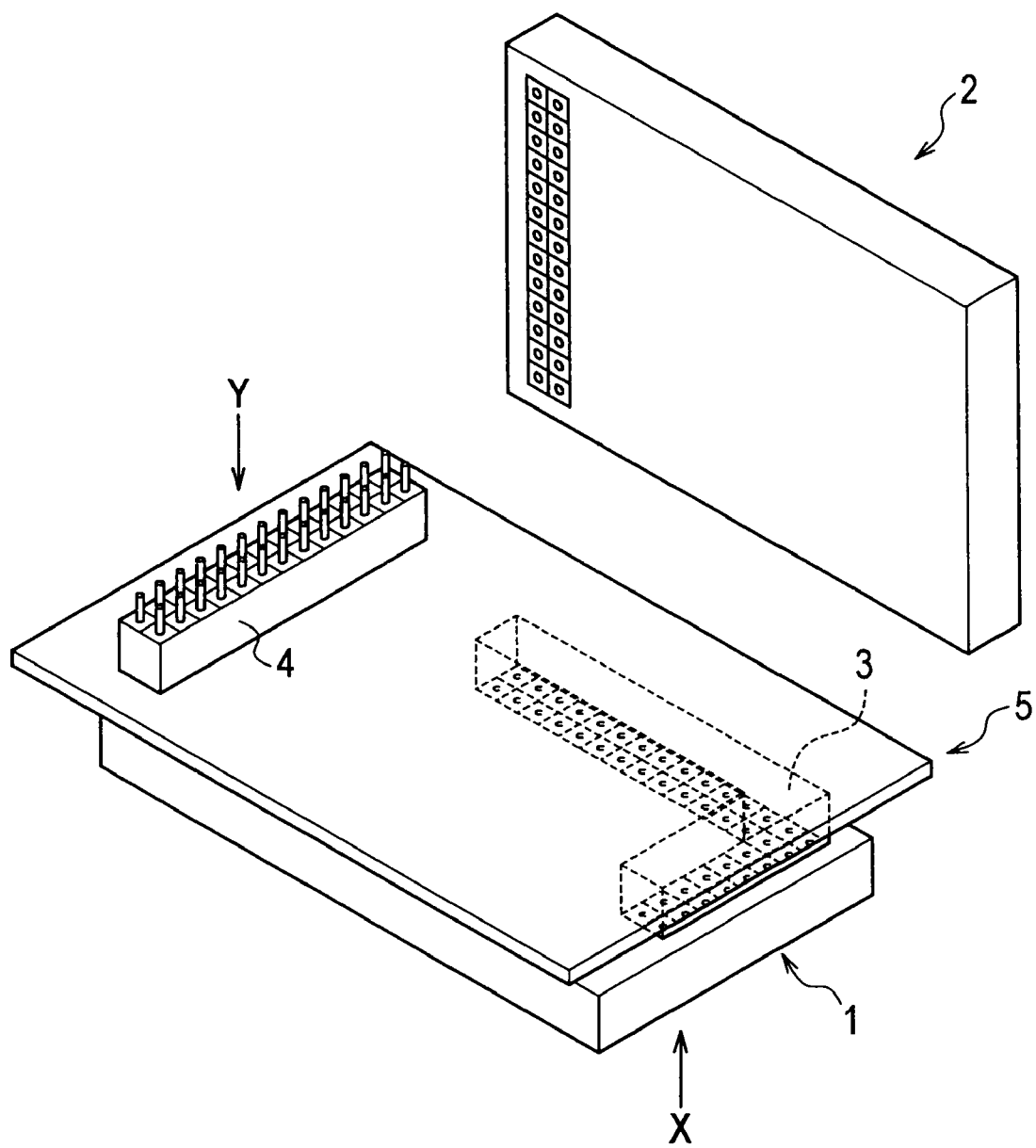
FIG. 10 is a view for describing positions of connectors provided on a substrate of an electronic device according to Modified Example 2 of the present invention.
Figure 11:
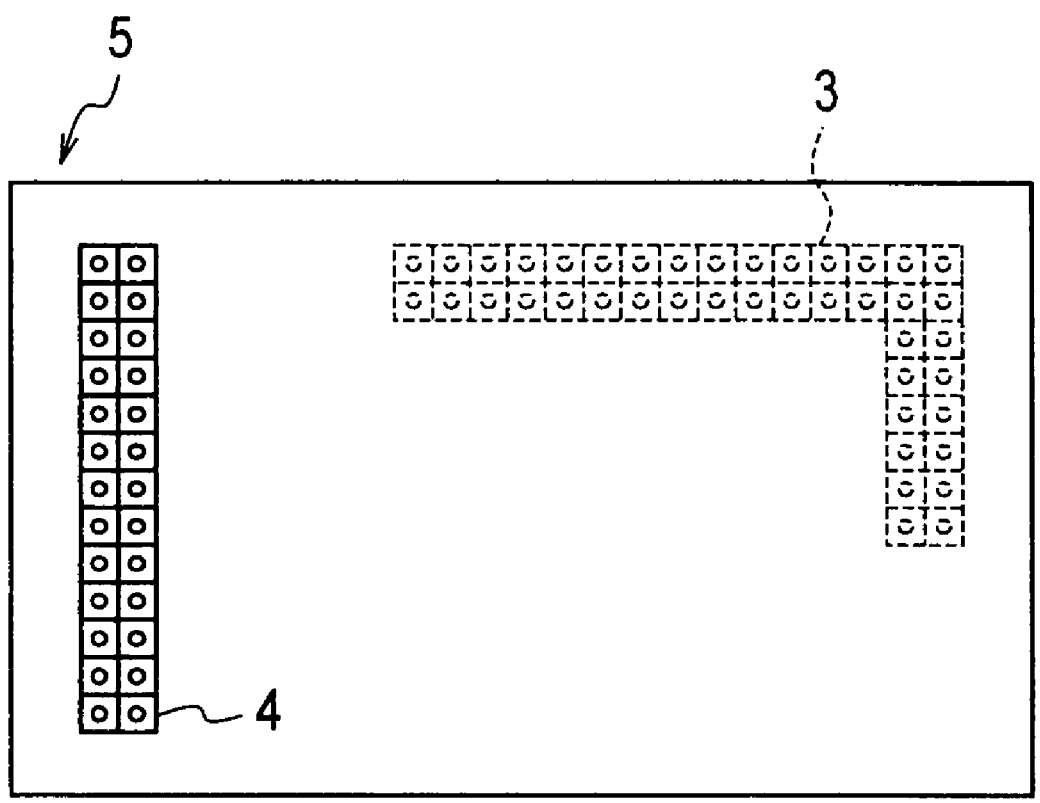
FIG. 11 is a view for describing positions of connectors provided on a substrate of the electronic device according to Modified Example 2 of the present invention.

As shown in FIGS. 10 and 11, in the electronic device according to Modified Example 2 of the present invention, a connector 3 and connector 4 are such provided that a first direction X and a second direction Y will be different by 180° (i.e., diametrically opposed) on a plane that is substantially perpendicular to a front surface 5A and a back surface 5B of a substrate 5, rather than the connector 3 and the connector 4 being such provided that the first direction X and the second direction Y will be different on a plane that is substantially parallel to the front surface 5A and the back surface 5B of the substrate 5.

In fact, in the electronic device according to Modified Example 2, a storage device 1 is connected to the connector 3 (first connecting part) provided on the front surface 5A of the substrate 5 by being slid (moved) in a direction (first direction X) substantially perpendicular to the front surface 5A of the substrate 5. Additionally, a storage device 2 is connected to the connector 4 (second connecting part) provided on the back surface 5B of the substrate 5 by being slid in a direction (second direction Y) substantially perpendicular to the back surface 5B of the substrate 5.

In addition, the shapes of the storage device 1 (or depression 6A) and the storage device 2 (or depression 6B) are formed according to positions where the connectors 3, 4 are placed.

Alternatively, as shown in FIG. 10, the connectors 3, 4 may have different shapes.

Modified Example 3

An electronic device according to Modified Example 3 of the present invention will be described with reference to FIGS. 12 and 13.

Figure 12:
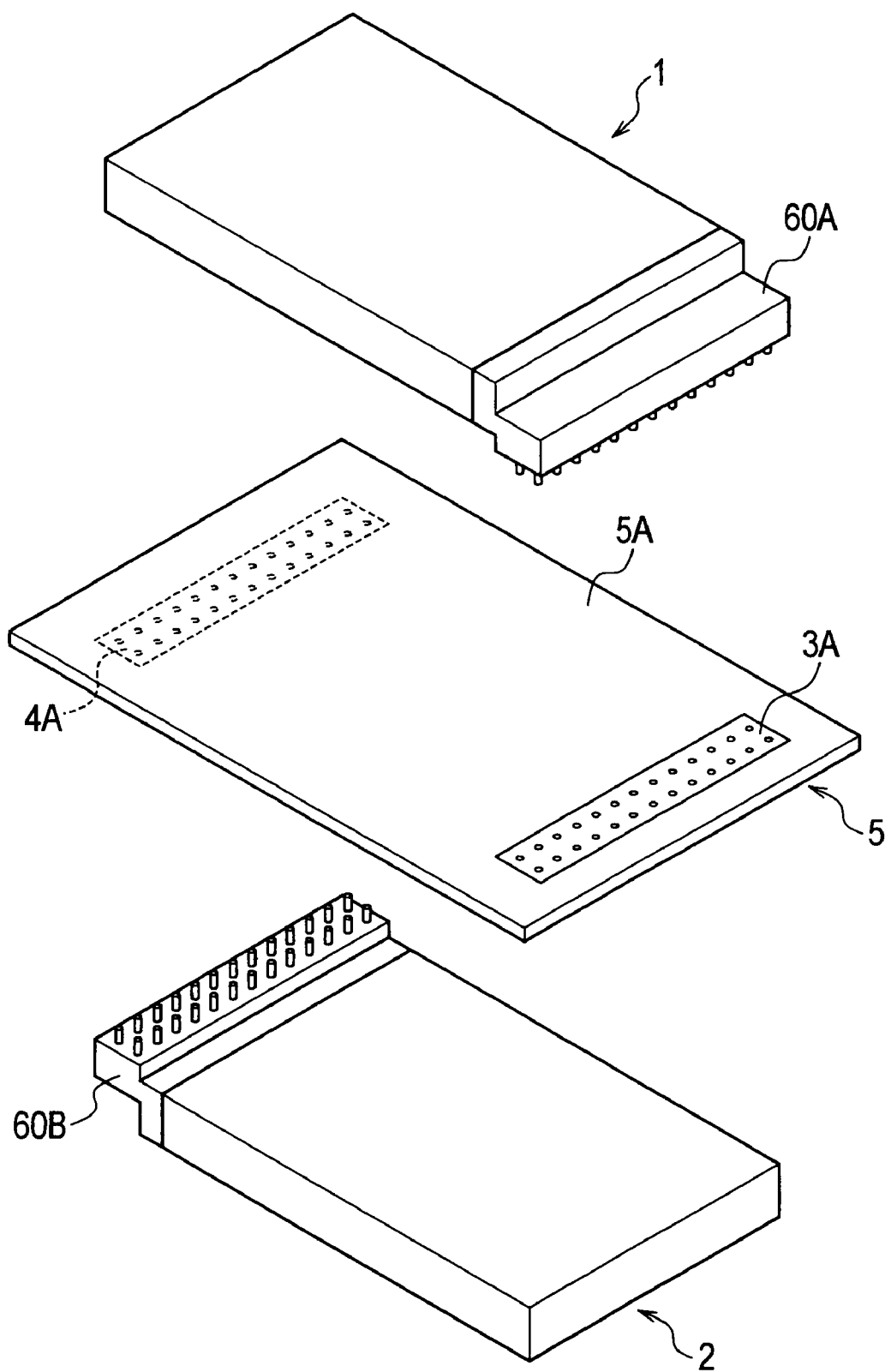
FIG. 12 is a view for describing an electronic device according to Modified Example 3 of the present invention.
Figure 13:
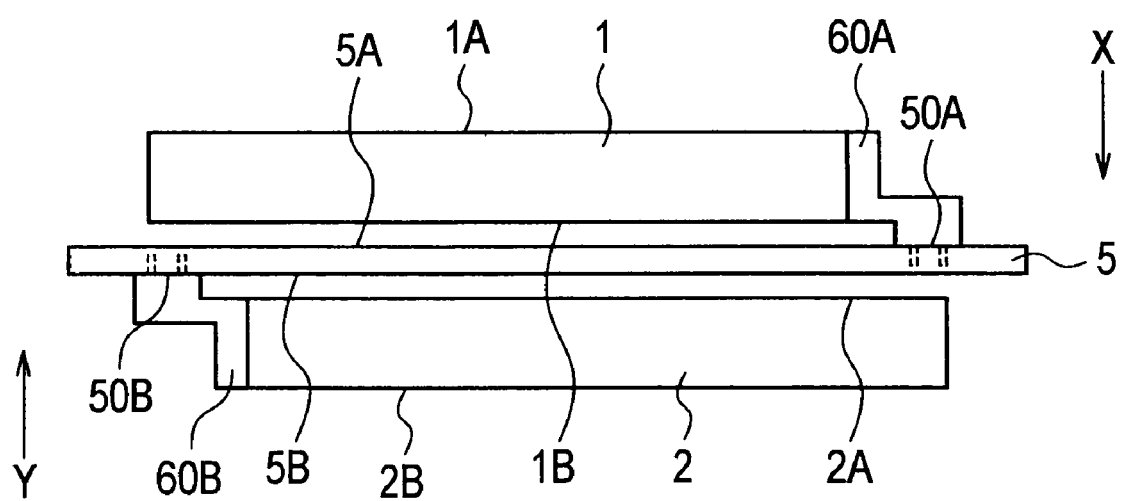
FIG. 13 is a view for describing the electronic device according to Modified Example 3 of the present invention.

As shown in FIGS. 12 and 13, in the electronic device according to Modified Example 3, instead of connectors 3, 4, wiring holes (through-holes) 3A, 4A are provided on a front surface 5A and a back surface 5B of a substrate 5 as connecting parts.

In such the case, storage devices 1, 2 are connected to the wiring holes 3A, 4A provided on the front surface 5A and the back surface 5B of the substrate 5, by use of connectors 60A, 60B connected to the storage devices 1, 2, respectively.

Specifically, in the structure of the electronic device according to Modified Example 3, the storage device 1 is connected to the wiring hole 3A (first connecting part) provided on the front surface 5A of the substrate 5 by being slid (moved) in a direction (first direction X) substantially perpendicular to the front surface 5A of the substrate 5 by use of the connector 60A. On the other hand, the storage device 2 is connected to the wiring hole 4A (second connecting part) provided on the back surface 5B of the substrate 5 by being slid in a direction (second direction Y) substantially perpendicular to the front surface 5B of the substrate 5 by use of the connector 60B.

Modified Example 4

In an electronic device according to Modified Example 4 of the present invention, a space occupying body is provided instead of the storage device 2 (second storage device).

The space occupying body is to be used in a case where it is assumed that after purchasing an electronic device into which only one storage device 1 has been incorporated, a user wishes to add another storage device 2.

In such a case, the space occupying body is configured to occupy a space within a housing 8 in which the storage device 2 will be added, and made of plastics, metal, or the like. Additionally, the space occupying body may be formed in any shape. As shown in FIG. 2, a space occupying body 100 may have a similar shape to the storage device 2, for example.

In the structure of the electronic device according to Modified Example 4, the space occupying body 100 is connected to a connector 4 with the largest surface of the space occupying body 100 being substantially parallel to the front surface 5A and the back surface 5B of the substrate 5.

In addition, the space occupying body 100 is connected to the connector 4 provided on the back surface 5B of the substrate 5 by being slid in the second direction Y described above.

The present invention has been described above in detail by use of the embodiment described above. However, it is obvious to those skilled in the art that the present invention is not limited to the embodiment described in the specification. The present invention can be implemented as corrected and modified aspects without departing from the spirit and scope of the invention to be defined by the description in "What is claimed is." Hence, the description of the specification is for illustrative purposes only, and is not intended to limit the present invention.

What is claimed is:

1. An electronic device comprising:

a substrate;

connecting parts provided on a front surface and a back surface of the substrate; and two storage devices connectable to the connecting parts, wherein the storage devices are connected to the connecting parts, with a largest surface of each of the storage devices being substantially parallel to the front surface and the back surface, and a placement position of one of the connecting parts on the front surface is not opposed to a placement position of the other one of the connecting parts on the back surface, with the substrate in between.

2. The electronic device according to claim 1 wherein the connecting parts include a first connecting part provided on the front surface, and a second connecting part provided on the back surface, one of the two storage devices is connected to the first connecting part by being moved in a first direction, the other one of the two storage devices is connected to the second connecting part by being moved in a second direction, and the first connecting part and the second connecting part are provided so that the first direction and the second direction are different.

3. The electronic device according to claim 1, wherein one of the two storage devices is adjacent to the front surface of the substrate, and the other one of the two storage devices is adjacent to the back surface of the substrate.

4. An electronic device comprising:

a substrate;

connecting parts provided on a front surface and a back surface of the substrate; and a storage device and a space occupying body which are connectable to the connecting parts, wherein the storage device is connected to one of the connecting parts, with the largest surface of the storage device being substantially parallel to the front surface and the back surface, the space occupying body is connected to the other one of the connecting parts, with the largest surface of the space occupying body being substantially parallel to the front surface and the back surface, and a placement position of the one connecting part on the front surface is not opposed to a placement position of the other connecting part on the back surface, with the substrate in between.

5. The electronic device according to claim 4, wherein the connecting parts include a first connecting part provided on the front surface of the substrate, and a second connecting part provided on the back surface of the substrate, the storage device is connected to the first connecting part by being moved in a first direction, the space occupying body is connected to the second connecting part by being moved in a second direction, and the first connecting part and the second connecting part are provided so that the first direction and the second direction are different.

6. The electronic device according to claim 4, wherein the storage device is adjacent to the front surface of the substrate, and the space occupying body is adjacent to the back surface of the substrate.

* * * * *